Patented Apr. 23, 1940

2,197,837

UNITED STATES PATENT OFFICE 2,197,837

MINERAL OIL COMPOSITION

Orland M. Reiff, Woodbury, N. J., assignor to Socony-Vacuum Oil Company, Incorporated, New York, N. Y., a corporation of New York No Drawing. Application December 21, 1938, Serial No. 247,001

17 Claims. (Cl. 87—9)

This invention has to do in a general way with mineral oil compositions and is more particularly related to compositions comprised of a mineral oil fraction and a minor proportion of an added ingredient which will improve such oil fraction in one or more important respects.

It is the principal object of this invention to provide a viscous mineral oil composition in which the viscosity index or the pour point or both of these properties have been substantially improved by the addition thereto of a single improving agent. It is a further object of this invention to provide a mineral oil composition containing the novel improving agent hereinabove referred to, which in addition to the improvements mentioned above is further improved in that such additive agent inhibits certain of the deleterious effects of oxidation attending the use of the oil.

My invention, for example, contemplates an improving agent which may be incorporated in a mineral oil of the type used to lubricate internal combustion engines and which under the conditions of use normally encountered in an internal combustion engine retards to a substantial degree the formation of those carbonaceous deposits which normally cause sticking of the piston rings and filling of the slots in the oil rings with sludge.

I have discovered that the last-mentioned property of inhibition is present in compounds characterized by the presence of an aromatic nucleus in which at least one nuclear hydrogen is substituted with a hydroxyl group and another nuclear hydrogen is substituted with a carboxyl group. This characterizing group may be represented by the formula:

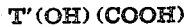

in which T' represents an aromatic nucleus; OH represents at least one hydroxyl group attached to the nucleus T'; and COOH represents at least one carboxyl group attached to the nucleus T'.

Compounds of the type represented by the above characterizing group, which will be recognized as typifying hydroxyaromatic carboxylic acids which are otherwise unsubstituted, are not miscible with mineral oil to an extent sufficient for effecting improvement of the oil. It is therefore important that the improving agents containing the above characterizing group have additional nuclear hydrogen replaced with substituents of a solubilizing nature.

In other words, it is important that the aryl nucleus T' carry a substituent or substituents which will render the composition as a whole miscible with mineral oil fractions. By the terms "oil-miscible" or "oil-soluble" as they are used herein I have reference to that property of remaining uniformly dispersed in the mineral oil fraction either as a true solution or as a colloidal suspension during normal conditions of handling and use.

The improving agents contemplated by this invention, therefore, are further characterized by the presence of alkyl substituents in the aryl nucleus, and those agents which are preferred in view of their multifunctional property of improving the pour point and viscosity index of the oil in addition to inhibiting the effects of oxidation thereon are further characterized by the presence of alkyl or aliphatic substituents on the aryl nucleus T', which substituents correspond to certain aliphatic hydrocarbon compounds of relatively high molecular weight and are herein referred to as heavy alkyl groups.

As a general proposition it may be said that the improving agents contemplated by this invention are hydroxyaromatic carboxylic acids having the characterizing group T'(OH)(COOH) in which additional nuclear hydrogen on the nucleus T' is replaced with an oil-solubilizing substituent such as a predominantly aliphatic material, which substituent comprises a sufficient proportion of the compound or composition as a whole to render the same miscible with mineral oil fractions under normal conditions of handling and use.

As a further generalization it may be said that at least one point on the aromatic nucleus T', and preferably two or more points on such nucleus, is substituted with aliphatic hydrocarbon radicals or groups, such aliphatic radicals or groups preferably being high molecular weight derivatives or heavy alkyl groups which are derived, for example, from a predominantly aliphatic material such as petroleum wax.

The simplest type of compound satisfying the above requisites may be represented by the formula:

I. 

in which R represents at least one aliphatic hydrocarbon radical or group preferably corresponding to a relatively high molecular weight aliphatic hydrocarbon compound of at least twenty carbon atoms and attached to a mono- or poly-cyclic aromatic nucleus T, which also carries at least one hydroxyl (OH) and one carboxyl (COOH) group.

In addition to the aliphatic or alkyl substituent R the alkylated hydroxyaromatic acids contemplated herein as mineral oil-improving agents may have additional nuclear hydrogen replaced with other substituents which may or may not have a solubilizing effect upon the composition as a whole. Such a compound in its simplest form may be represented by the formula:

II.        A(T(OH)(COOH)Y)

in which R, T, (OH) and (COOH) have the same significance indicated above and in which Y represents residual hydrogen which may be replaced by a radical from the group consisting of: chlorine, alkoxy, aroxy, alkaryl, aralkyl, nitro and amino radicals or groups. Compounds of the above general formula type having mono-, di-, and tri- cyclic aryl nuclei are illustrated by the following specific formulae:

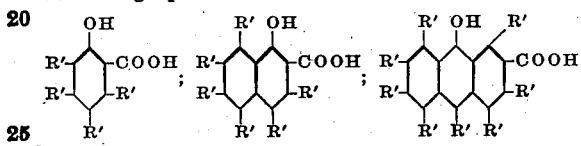

in which at least one R' represents an aliphatic radical or group, preferably a heavy alkyl group, and in which the remaining R''s represent residual hydrogen which may be replaced with hydroxy, carboxy, chlorine, alkoxy, aroxy, aralkyl, alkaryl, nitro and amino radicals or groups.

In the foregoing examples it will be observed that the aliphatic or alkyl substituent is a monovalent aliphatic hydrocarbon group, but as will appear from the hereinafter described synthesis of the preferred heavy alkyl or wax-substituted hydroxyaromatic carboxylic acids, part or all of the aliphatic hydrocarbon material may be comprised of polyvalent aliphatic hydrocarbon radicals or groups in which the several valence bonds are attached to separate aromatic nuclear groups. Compounds of this type are included under the following general formula representation:

III.        $R^v(T(OH)(COOH)Y_b)_n$ in which T, (OH) and (COOH) have the same significance indicated above; $R^v$ represents at least one aliphatic or alkyl radical or group, such alkyl group or groups being attached by one valence bond only to at least one aromatic nucleus T, $v$ representing the valence of the radical $R^v$, which may be from one to four; $Y_b$ represents a monovalent aryl radical or group selected from the class identified above in connection with Y; $b$ represents the number of $Y_b$ radicals or groups and is equal to zero or a whole number corresponding to the valence bonds on the nucleus T not satisfied with $R^v$, (OH) or (COOH); and $n$ represents a whole number from one to four and indicates the total number of T(OH)(COOH)$Y_b$ groups present in the molecule represented by the formula and attached to the aliphatic group or groups represented by $R^v$ through the valence bonds $v$.

In the foregoing general Formula III it will be seen that the compounds represented thereby include those materials in which all of the aliphatic substituent ($R^v$) is monovalent ($v=1$ and $n=1$) or in which all of the aliphatic substituent is polyvalent ($v$ and $n$ being equal to two, three, or four) or since $R^v$ is defined as being at least one aliphatic radical or group and may therefore include several such groups, it will be seen that general Formula III is also inclusive of compounds having aliphatic groups or radicals of different valences (from two to four) in the same molecule. Also it will be observed that since $n$ may be any whole number from one to four, the number of aromatic nuclei T in the molecule may likewise vary from one to four. Thus the relationship between $n$ and $v$ in Formula III in its broadest aspect is such that when $n$ is equal to one, $v$ is equal to one, and when $n$ is greater than one, the valence $v$ of at least one of the $R^v$'s is equal to $n$ (in order to tie the several nuclei or T's together), the valences of any remaining $R^v$'s being any whole number equal to or less than $n$.

As stated above and as will appear more fully later from the description of their synthesis, the alkylated hydroxyaromatic acids wherein the aryl nucleus is substituted with a heavy alkyl group may contain both monovalent and polyvalent aliphatic substituents. Both the monovalent and polyvalent substituents, if both are present, may be introduced in the nucleus as part of an alkylation reaction, or all or part of the monovalent substituent may be present in the nucleus of a hydroxyaromatic starting material as low molecular weight aliphatic groups such as methyl, ethyl, propyl, groups, etc.

Compounds of the general type last described above, which include polyvalent-substituted aliphatic substituents and may also include both monovalent and polyvalent aliphatic substituents, are included under the following subgeneric formula:

IV.        $R^{v'}(T(OH)(COOH)Y_b'R_c)_{n'}$ in which T, (OH) and (COOH) have the same significance indicated above; $R^{v'}$ represents at least one polyvalent aliphatic radical or group having a valence $v'$ of two, three, or four; $Y_b'$ indicates the same group of substituents described above for Y; $R_c$ represents monovalent aliphatic radicals or groups; $b'$ represents the number of $Y_b'$'s and is equal to zero or a whole number corresponding to the replaceable hydrogens on the nucleus T not replaced with $R^{v'}$, (OH), (COOH) and $R_c$; $c$ indicates the number of $R_c$'s and is equal to zero or a whole number corresponding to the replaceable hydrogens on the nucleus T not replaced with $R^{v'}$, (OH), (COOH) and $Y_b'$; and $n'$ represents a whole number from one to four and indicates the total number of groups (T(OH)(COOH)$Y_b'R_c$) present in the molecule represented by the formula which are attached to the aliphatic group or groups represented by $R^{v'}$ through its available valences $v'$.

In the above general Formulae III and IV it will be understood that since $R^v$ (or $R^{v'}$) represents aliphatic hydrocarbon radicals of the chain type, each of such radicals being attached by only one valence bond to each corresponding aromatic nucleus, the valence $v$ (or $v'$) of such radical or radicals is of necessity never greater than the number $n$, which indicates the number of aromatic nuclei in the molecule and in Formula III is always equal to one when $n$ equals one. Otherwise an $R^v$ or an $R^{v'}$ having a valence greater than the number ($n$ or $n'$) of aromatic nuclei would either have some of its valence bonds unsatisfied or else would form a condensed ring or rings by attachment at two or more points to the same aromatic nucleus. Such latter compounds, as already indicated from the definition of $R^v$ and $R^{v'}$, are not considered as characterizing the improving agent of the present invention, although probably formed in some instances in minor amounts as unobjectionable by-products by certain of the methods of preparation herein disclosed.

A simple type of compound coming under general Formula III in which $v$ and $n$ is each equal to one and in which only one oil-solubilizing aliphatic group $R^v$ is attached to the nucleus T may be illustrated by the following formula showing T for purpose of illustration as a monocyclic aromatic nucleus:

A.
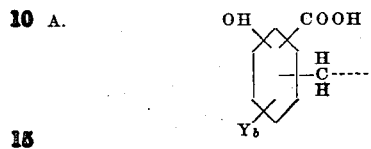

In the above formula the chain represents the oil-solubilizing heavy alkyl substituent ($R^v$), and $Y_b$, (OH) and (COOH) have the same significance as has been heretofore given to these groups.

Since group $R^v$ has been defined as "at least one", it will be apparent that there may be more than one heavy alkyl substituent attached to the nucleus T. Such a compound where $v$ and $n$ are each one and in which there are two such monovalent $R^v$ groups may be represented by the following formula:

B.
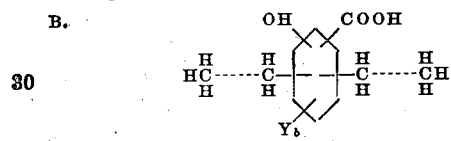

in which the chains and the substituent characters have the same significance defined above.

Compounds of the type satisfying the general Formula III and the subgeneric Formula IV, in which $R^v$ (or $R^{v'}$) is polyvalent and $v$ (or $v'$) and $n$ (or $n'$) are more than one and in which there is only one such polyvalent $R^v$ group, may be illustrated by the following formula, in which the aryl nucleus T is again indicated for illustration as being monocyclic:

C.
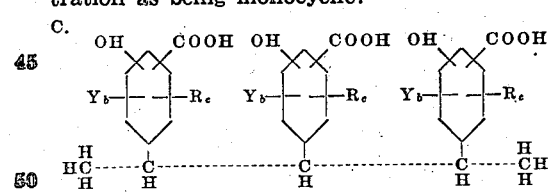

In the above Formula C, $R_c$ is a monovalent alkyl group as defined above under Formula IV and is the same as monovalent $R^v$ in Formula III.

Under this same type of compound indicated by Formula C there may also be more than one polyvalent $R^v$ group (represented by the chain), such a compound in which there are, for example, two polyvalent $R^v$ groups being illustrated by the following formula, in which the characterizing groups have the same significance described above under Formula C:

D.
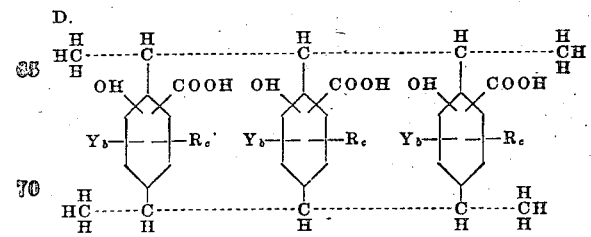

The possible molecular structure of compounds in which the aryl nucleus T is polycyclic will be obvious from the foregoing exemplary Formulae A to D inclusive, and the possible molecular structure of compounds in which $v$ and $n$ are equal to two and four will be readily understood from the exemplary Formulae C and D.

Another possible molecular structure of compounds coming under general Formula III is a compound having more than one polyvalent $R^v$, at least two of which have different valences. Such a compound may be typified by the following formula in which the symbols have the same significance as in Formula C:

E.
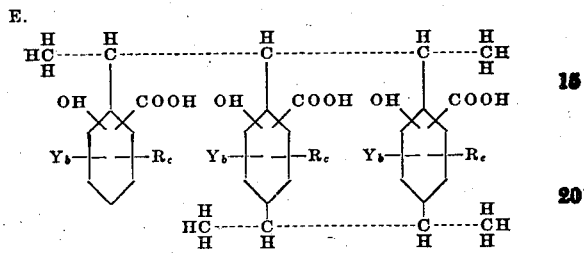

As to the possible number of $R^v$ (and $R_c$) groups going to make up a single molecule, this will vary with the extent to which it is desired to effect substitution of the nucleus with oil-solubilizing aliphatic groups for obtaining the desired properties in the product and is, of course, limited by the number of replaceable hydrogens on the aromatic nucleus which are available for substitution. As will be apparent to those skilled in the art, the maximum possible number of $R^v$ (and $R_c$) groups which can be attached to a single aromatic nucleus will vary as the nucleus is mono- or poly- cyclic and also as the nucleus is otherwise substituted. It will also be apparent that replaceable hydrogens on the nuclei may all be substituted by polyvalent aliphatic groups.

It will be understood that the oil-improving agents contemplated by this invention may be pure compounds satisfying the general Formula III described above with any one of the various mono- and poly- cylic aromatic nuclei as T and the various substituents $R^v$ (or $R^v_c$ and Y) described, the only requisites being that at least one nuclear hydrogen be substituted with a hydroxyl group, at least one nuclear hydrogen be substituted with a (COOH) group, and at least one nuclear hydrogen be substituted with an oil-solubilizing high molecular weight aliphatic radical or group. However, in manufacturing the preferred oil-improving product of the present invention by the preferred method of procedure, as will appear more fully later on, the final oil-improving product obtained is normally or usually a mixture of different compounds corresponding to different values of $n$ and $v$ and to different numbers of aliphatic groups $R^v$.

As has been emphasized hereinabove, it is important that the oil-improving agents as represented by general Formulae III and IV have nuclear hydrogen in the aromatic nucleus T substituted with predominantly aliphatic material which comprises a sufficient proportion of the composition as a whole to render the same miscible with mineral oil fractions under normal conditions of handling and use. It appears from the results of my research that there is a critical range in the degree of alkylation of the alkylated hydroxyaromatic acids contemplated herein below which the product will not satisfy the requirements for oil-miscibility.

Expressing this in another way, it appears that the hydroxyaromatic constituent should not exceed a certain percentage of the alkylated composition as a whole. This critical range of alkylation may be roughly expressed as the ratio by weight of $(T(OH))_n$ to $R^v(T(OH))_n$. The critical range in the degree of alkylation of the aryl nucleus for oil-solubility may vary with: (a) the mineral oil fraction in which the improving agent is to be used; (b) the aryl nucleus T (mono- or poly- cyclic); (c) the hydroxyl content of the aryl nucleus (mono- or poly- hydric); (d) the character of the aliphatic material comprising the solubilizing substituent (straight or branched chain); (e) mono- or poly- substitution of the aryl nucleus; and (f) other substituents on the nucleus T which may be of positive or negative or of neutral solubilizing activity.

In general it may be said that a polycyclic nucleus appears to require a higher degree of alkylation than a monocyclic nucleus; that a polyhydric nucleus appears to require a higher degree of alkylation than a monohydric nucleus; and that branch chain aliphatic substituents have a somewhat greater solubilizing action than the straight chain substituents.

In view of the foregoing variables it would be impracticable and probably misleading to attempt to give an expression and figure which would accurately indicate the proper ratio of hydroxyaromatic constituent to the alkylated hydroxyaromatic constituent satisfying all cases taking these variables into account.

As a guide for preparing these improving agents, however, my research indicates that for a hydroxyaromatic acid of the multifunctional type which has pour depressing and V. I. improving properties in addition to its antioxidant properties the ratio expressed as VII. $\quad \dfrac{(T(OH))_n}{R^v(T(OH))_n}$ should not be greater than .20 when the weight of the hydroxyaromatic component $(T(OH))_n$ is expressed in terms of its chemically equivalent weight of phenol. It will be observed that the ratio as expressed by Formula VII above does not take into account any other substituent in the nucleus than the aliphatic substituents and the hydroxyl group, but since the aliphatic substituent is primarily relied upon as the solubilizing medium in these hydroxyaromatic acids, it is believed that the foregoing expression and limits will serve as a working guide for the preparation of oil-soluble materials and particularly of the preferred multifunctional hydroxyaromatic acids.

The ratio of twenty per cent, which I may term the "phenolic ratio", represents what I consider a maximum figure for the preferred products contemplated herein, and in general it will be found that this figure will be lower. The actual ratio, of course, depends upon the variable factors enumerated above. For example, as will hereinafter appear, an oil-soluble hydroxyaromatic acid of the multifunctional type in which the aliphatic substituent is derived from petroleum wax, a predominantly straight chain aliphatic hydrocarbon of at least twenty carbon atoms, and in which the aromatic nucleus was derived from phenol otherwise unsubstituted should have a phenolic ratio as expressed above not substantially greater than about sixteen per cent.

The degree of alkylation for these preferred multifunctional hydroxyaromatic acids may also be expressed by the number of carbon atoms contained in the aliphatic substituent for a given hydroxyaromatic nucleus T. As a general guide in this connection it may be said that the substituents represented by $R^v$ in the above general Formula III should, for these preferred compounds, contain at least twenty-five carbon atoms for each aromatic nucleus.

A still further guide for the synthesis of the improving agent preferred for use in viscous oils is to alkylate the aromatic nucleus so that it is polysubstituted with aliphatic hydrocarbon radicals or groups of relatively high molecular weight. The procedure whereby the alkylated hydroxyaromatic carboxylic acids contemplated herein can be prepared may be broadly described as involving the steps of first substituting the hydroxyl hydrogen in an alkylated compound with an alkali or alkaline earth metal to form the alkylated aryl metal oxide. The alkali or alkaline earth metal oxide is then carboxylated to form the alkali or alkaline earth metal salt, which upon neutralization with a mineral acid yields the alkylated hydroxyaromatic acid and a mineral salt which can be separated by a purification step. These reactions may be indicated by the folowing general equations:

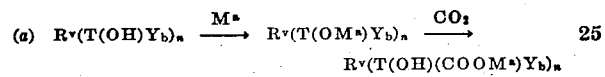

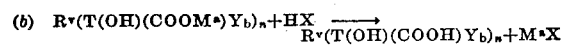

in which $M^a$ indicates an alkali or alkaline earth metal; HX indicates a mineral acid; and the remaining characters have the same significance described above in connection with general Formula III.

In the reactions described above an alkylated or aliphatic-substituted hydroxyaromatic compound is shown as the starting material. Compounds of this nature which satisfy the requirements of high alkylation for the preferred multifunctional hydroxyaromatic acids can be readily prepared by alkylating a mono- or poly- cyclic, mono- or poly- hydric, substituted or unsubstituted, hydroxyaromatic compound with aliphatic compounds or predominantly aliphatic materials.

The starting material for the hydroxyaromatic constituent in the alkylation reaction to obtain the product $R^v(T(OH)Y_b)_n$ in which $Y_b$, if present, is residual hydrogen may be a mono- or polycyclic hydroxyaromatic compound otherwise unsubstituted; or a hydroxyaromatic compound containing alkyl substituents; or in certain special cases (to be hereinafter described) the starting material may be an alkyl aryl ether or an aralkyl aryl ether.

For obtaining an alkylated hydroxyaromatic product containing a Y substituent in addition to or in place of residual hydrogen the starting material for the hydroxyaromatic constituent may be a mono- or poly- cyclic hydroxyaromatic compound in which part of the nuclear hydrogen is substituted with a member or members of the group consisting of chlorine, hydroxy, alkoxy, aroxy, aryl, alkaryl and aralkyl groups.

Examples of the hydroxyaromatic compounds which may be used as starting material for the alkylation reaction are: phenol, resorcinol, hydroquinone, catechol, cresol, xylenol, hydroxydiphenyl, benzylphenol, phenyl-ethyl-phenol, phenol resins, methyl-hydroxydiphenyl, guaiacol, alpha and beta naphthol, alpha and beta methyl naphthol, tolyl naphthol, xylyl naphthol, benzyl naphthol, anthranol, phenyl methyl naphthol, phenanthrol, diphenyl ether, anisole, beta naphthyl methyl ether, chlorphenol and the like. Preference in general is to the monohydroxy phenols otherwise unsubstituted, particular preference being given to phenol and alpha and beta naphthol.

The alkylation of the hydroxyaromatic compound may be accomplished in various ways, such as by Friedel-Crafts synthesis using a halogenated aliphatic hydrocarbon; by reaction with unsaturated high molecular weight aliphatic compounds or higher alcohols in the presence of a suitable catalyst such as sulfuric acid; etc.

I have found the Friedel-Crafts type of alkylation reaction to be particularly adapted to the step of preparing the alkylated hydroxyaromatic compounds from which the preferred multifunctional hydroxyaromatic acids are obtained because the Friedel-Crafts synthesis affords a convenient means of controlling the degree of alkylation and obtaining the desired phenolic ratio.

In this latter type of synthesis an appropriate mono- or poly- chlorine-substituted aliphatic compound or material is reacted with the desired hydroxyaromatic compound in the presence of a Friedel-Crafts catalyst such as a catalytic amount of aluminum chloride. Pure or substantially pure chlorinated aliphatic compounds may be used. However, as will be readily understood by those skilled in the art, since it is usually difficult to prepare or obtain high molecular weight aliphatic hydrocarbons in a pure or substantially pure state and since it is equally difficult to prepare the chlorine- or other halogen- substituted products in a pure or substantially pure state, I prefer to employ a mixture of such halogenated hydrocarbons such as halogenated petroleum fractions as the starting material. In general it may be said that the high molecular weight aliphatic hydrocarbons contemplated as preferred sources for the alkyl substituent $R^v$ in Formula III for obtaining multifunctional hydroxyaromatic acids may be pure or mixed compounds typified by those which characterize the heavy products of petroleum, such as heavy petroleum oils, crystalline petroleum wax, etc., or other compounds or materials which will result in relatively long hydrocarbon chain substituents. Special preference is given to petroleum wax of the melting point not substantially less than about 120° F. and having a molecular weight of about 250 and at least twenty carbon atoms in the characterizing molecules.

As stated above, the Friedel-Crafts synthesis affords a convenient means of controlling the "degree of alkylation" of the product. This is accomplished by controlling the chlorination of the aliphatic hydrocarbon and the reacting proportions of the chlorinated aliphatic hydrocarbon to the hydroxyaromatic compound used in the Friedel-Crafts reaction.

It will be apparent to those skilled in the art that the number of chlorine substituents in a chlorinated aliphatic compound used in the Friedel-Crafts synthesis corresponds to the number of valence bonds ($v$ in general Formula III) which will be satisfied by or attached to hydroxyaromatic nuclei in the product of the Friedel-Crafts reaction. It appears that the required solubilizing action of the long chain aliphatic substituent is not obtained if the aliphatic group carries more than four aryl nuclei, and for this reason it is preferred to use an aliphatic hydrocarbon which has not been chlorinated in excess of a tetrachlor compound so that the product of general Formula III is one in which $v$ and $n$ must be not greater than four.

The degree of alkylation or the "phenolic ratio"

$$\frac{(T(OH))_a}{R^v(T(OH))_n}$$

is usually calculated from the weight of hydroxyaromatic compound used up in the alkylation reaction and from the total weight of alkylated compound resulting from such alkylation reaction, as will be readily understood by those skilled in the art.

For example, when the Friedel-Crafts synthesis is used for alkylation, the aliphatic hydrocarbon material is first chlorinated until the weight of chlorine absorbed indicates that the average composition of the chlorinated product corresponds roughly to say a dichloraliphatic hydrocarbon. Such a product will, of course, contain some mono- and tri-chlor compounds and probably some tetrachlor compounds. The reacting proportions (based upon atomic proportions of chlorine to one mol of hydroxyaromatic compound) are then selected so that the theoretical product of the Friedel-Crafts reaction will give the approximate phenolic ratio desired. After the Friedel-Crafts reaction and purification of the product the weight of aliphatic material in the chlorinated aliphatic starting material is subtracted from the weight of the alkylated or aliphatic-substituted product to obtain the weight of hydroxyaromatic material $((T(OH))_n)$ actually combined or used up in the alkylation synthesis. From this value and the weight of the alkylated product $(R^v(T(OH))_n)$ the phenolic ratio or phenol content can be readily calculated. If there are other substituents $(Y_b)$ on the hydroxyaromatic nucleus in addition to the mono- or poly-valent aliphatic groups, a deduction should be made for them before calculating the phenolic ratio, an operation which will be apparent to those skilled in the art.

In the foregoing description of the Friedel-Crafts alkylation reaction I have referred to a hydroxyaromatic compound as a starting material. This same reaction may be used with an alkyl-aryl ether or an aralkyl-aryl ether which undergoes a substantial rearrangement during Friedel-Crafts alkylation to form an alkylated hydroxyaromatic compound in which the alkyl group of the ether replaces one of the nuclear hydrogen atoms.

Since the product of a Friedel-Crafts reaction between a chlorinated aliphatic material of the type referred to above and a hydroxyaromatic compound will be a mixture of different compounds corresponding to different values of $v$ and $n$ in the formula $R^v(T(OH)Y_b)_n$ and the final alkylated hydroxyaromatic acid derived therefrom according to the reaction of equations (a) and (b) above will likewise be a mixture of compounds corresponding to different values of $n$ and $v$ in general Formula III, it will be understood that the specific values for $v$ and $n$ in the above formula as well as the general formula itself relate to the different specific compounds present in such a mixture which characterize it as a product of this invention.

In the event it is desired to obtain an alkyl hydroxyaromatic acid of the type represented by general Formula III which contains an alkoxy or an aroxy group as the substituent $Y_b$, it is preferable that the alkylation be effected with a hydroxyaromatic compound containing such aroxy or alkoxy group as a substituent. This compound is then reacted with a high molecular weight unsaturated aliphatic hydrocarbon (such as polymerized isobutylene, dodecylene, tetra-decylene, octadecylene, myricene, etc.), or a higher alcohol, such as cetyl alcohol, myricyl alcohol, ceryl alcohol, octadecyl alcohol, etc.), using $H_2SO_4$ as a catalyst. By this procedure the hydroxyaromatic ether can be alkylated without substantial rearrangement taking place. As an alternative procedure, polyhydric phenols can be alkylated by reaction with alcohols or unsaturates or by Friedel-Crafts reaction, followed by substitution of one hydroxyl hydrogen with a low molecular weight alkyl group. In carrying out this latter procedure the alkylated polyhydric phenol is treated with an alkali alcoholate to introduce alkali metal into the OH group, followed by treating with the desired alkyl halide, whereby the substitution is effected.

When it is desired to obtain a nitro or amino group as the substituent $Y_b$ in general Formula III, the hydroxyaromatic compounds are alkylated when free of nitro or amino groups, and such alkylation is followed by nitration of the alkylated compound to introduce the nitro substituent. The amino group can be obtained by reduction of the nitro group.

The details in a preferred procedure for obtaining alkylated hydroxyaromatic acids of the multifunctional type and specific examples showing the improved properties which these compounds impart to mineral oil fractions will now be described.

PREPARATION OF WAX-SUBSTITUTED PHENOL CARBOXYLIC ACID (1) *Alkylation of phenol*

Paraffin wax having a melting point of approximately 120° F. and predominantly comprised of compounds having at least twenty carbon atoms was chlorinated by melting the wax and bubbling chlorine gas therethrough until the wax had absorbed from sixteen per cent to twenty per cent of chlorine. This product had an average composition between a monochlor and a dichlor wax or corresponded roughly to a dichlor wax. The chlorination was preferably continued until about one-fifth the weight of the chlorwax formed was chlorine.

A quantity of chlorwax thus obtained containing three atomic proportions of chlorine was heated to a temperature varying from just above its melting point and preferably not over 150° F., and one mole of phenol ($C_6H_5OH$) was admixed therewith. This mixture was then heated to about 150° F., and anhydrous aluminum chloride corresponding in amount to about three per cent of the weight of the chlorwax in the mixture was slowly added with active stirring. After the aluminum chloride had been added, the temperature of the mixture was increased slowly with the evolution of HCl gas to a final temperature of from about 300° F. to 350° F. If the emission of HCl gas had not ceased when the final temperature was reached, the mixture was held at that temperature for a short time to allow completion of the reaction.

Unreacted or non-alkylated phenol (hydroxyaromatic material) remaining after the alkylation reaction can be removed by water-washing, but it is preferable to treat the water-washed product with superheated steam, thereby insuring complete removal of the unreacted material and drying the product in the same operation.

The wax-substituted phenol obtained by the foregoing procedure may be characterized by the general formula: $R^v(T(OH)Y_b)_n$, in which $R^v$ represents an aliphatic group or radical characteristic of paraffin wax; $Y_b$ represents residual hydrogen; T represents a monocyclic aromatic nucleus; and the remaining characters have the same significance employed in the general Formula III.

Wax-substituted phenol prepared according to the above procedure, in which a quantity of chlorwax containing three atomic proportions of chlorine is reacted with one mole of phenol and in which the chlorwax contains twenty per cent chlorine, will for brevity herein be designated "wax-phenol (3-20)". Parenthetical expressions of the type (A—B) may be used hereinafter in connection with the alkyl hydroxyaromatic compounds to designate (A) the number of atomic proportions of chlorine in the chloraliphatic material reacted with one mole of hydroxyaromatic compound in the Friedel-Crafts reaction and (B) the chlorine content of the chloraliphatic material. In the above example A=3 and B=20.

This same designation will also apply to the alkylated hydroxyaromatic acids derived from these alkylated compounds.

Wax-phenol (3-20) as obtained by the above procedure had a phenol content or a phenolic ratio of about sixteen per cent. My research indicates that the phenolic ratio of sixteen per cent may be considered as representing about the maximum for satisfactory miscibility in viscous oils of alkylated hydroxyaromatic acids in which the hydroxyaryl constituent is derived from phenol ($C_6H_5OH$) and the alkyl substituent is derived from wax. Effective oil-improving agents can, however, be obtained from wax-phenol (3-16) in which the phenol content or phenolic ratio is in the neighborhood of thirteen per cent. In this same regard it should be understood that the phenolic ratio when applied to polycyclic compounds such as naphthol, for example, is expressed as the equivalent amount of phenol.

(2) *Formation of wax-substituted alkali or alkaline earth metal phenate*

As an example of this step in the preparation of the alkylated hydroxyaromatic acids, wax-substituted sodium phenate can be prepared by the reaction of wax-phenol with metallic sodium in the presence of a non-oxidizing gas. For example, 500 grams of wax-phenol having a combined phenol content of 13.2 per cent and sixteen grams of sodium or an equivalent amount of potassium were mixed together and heated during a two-hour period at a temperature of about 500° F. with rapid stirring to maintain the alkali metal in finely divided form, thereby accelerating the reaction.

The wax-substituted phenates of the alkali or alkaline earth metals may also be prepared by reacting a wax-phenol with the desired alcoholate or alkyl metal oxide of the metal. As an example, 500 grams of wax-phenol (3-16) having a phenolic ratio of 13.2 per cent was reacted with sixteen grams of sodium in the form of ethyl sodium oxide by heating the mixture to 300° F. during a one-hour period and allowing the alcohol released in the reaction to distill off.

(3) *Carboxylation and neutralization to obtain the wax-phenol carboxylic acid*

Wax-substituted sodium phenate obtained according to the foregoing procedure was heated to a temperature of about 350° F., and carbon dioxide gas was introduced at a rate sufficient to maintain this temperature. The pressure was gradually raised to about 500 pounds per square inch to complete the reaction at this temperature during a two-hour period.

Because of the high viscosity of the mixture it is advantageous to dilute the wax-substituted phenol initially with one or two parts of mineral oil. When a diluent is used the mixture can be stirred more readily, making it suitable to introduce $CO_2$ at a lower temperature if desired.

In carboxylating under pressure, the $CO_2$ can be introduced at room temperature, the mixture then being gradually raised to a temperature of about 350° F. to complete the reaction. When $CO_2$ is introduced under high pressure at higher temperatures such as 350° F. for instance, rapid changes in viscosity occur, making it more difficult to control the temperature of the reaction mixture. However, $CO_2$ can be introduced under low pressure at 350° F., then gradually increasing the $CO_2$ to the desired pressure without causing difficulty in temperature control.

The carboxylation can also be carried out at atmospheric pressure by introducing a current of $CO_2$ at about 400° F., whereby it is possible to complete the carboxylation in about a four-hour period, although a longer period may be required. A strictly anhydrous condition and good agitation of the reaction mixture are requisites for rapid carboxylation.

Other carboxylation reactions may be used in this step of the process, such for example, as the reaction of the alkali metal-wax-phenate with carbonyl chloride or carbon tetrachloride; but since the product formed in the presence of $CO_2$ is obtained in high yield and in a pure state, this is the preferred carboxylation procedure.

The product of the carboxylation reaction is the sodium salt of the wax-phenol carboxylic acid, which is then neutralized with hydrochloric acid to obtain wax-substituted phenol carboxylic acid and sodium chloride. The product is purified by diluting with a light mineral oil or benzol if desired and washing with water to remove the sodium chloride and any free mineral acid, breaking any emulsion that may be formed by the addition of an alcohol such as amyl alcohol. By distillation of the diluent, any entrained water is removed to give the finished product.

WAX-SUBSTITUTED NAPHTHOL CARBOXYLIC ACID

In addition to the wax-phenol carboxylic acid prepared according to the above procedure I have also prepared the corresponding acids of alpha and beta naphthol. In preparing these naphtholic acids the same procedure described above was followed, using, for example, wax-naphthol (3–14) and wax-naphthol (3–18), the former product having a combined naphthol content of sixteen per cent and an equivalent phenol content or "phenolic ratio" of 9.7 per cent.

As will appear from the foregoing description, the alkylated hydroxyaromatic acids contemplated by this invention as oil-improving agents are characterized by the general Formula III described hereinabove. Such acids may also be characterized as alkylated or wax-substituted carboxylic hydroxyaromatic compounds, it being understood that the terms alkyl or alkylated are used herein in a broad sense to include polyatomic or polyvalent aliphatic radicals or groups.

To demonstrate the effectiveness of these alkylated hydroxyaromatic acids in mineral oil compositions I have conducted several comparative tests with representative mineral oils alone and with the same oils blended with representative alkylated hydroxyaromatic acids. These tests, which with their results are discussed below, show that mineral oil compositions containing these materials are improved as to their pour point and viscosity index; also that the compounds contemplated herein may, when added to an oil in sufficient amount, inhibit that oil against the formation of products which normally cause piston ring trouble under the operating conditions encountered in an internal combustion engine.

POUR POINT DEPRESSION

The oil used in this test was a lubricating oil fraction having a Saybolt viscosity of 244 sec. at 130° F. and a pour point of +20° F. Using this oil, blends were prepared containing wax-phenol and wax-naphthols and the corresponding carboxylic acids in varying amounts, the results listed below in Table I demonstrating that the wax-hydroxyaromatic acids are more effective pour point depressants than the wax-phenolic compounds:

Table I

| Improving agent | A. S. T. M. pour point | | |
|---|---|---|---|
| | 0% | ⅛% | ¼% |
| | Degrees | Degrees | Degrees |
| None | +20 | | |
| Wax-phenol | +20 | 0 | −20 |
| Wax-phenol carboxylic acid | +20 | −15 | −20 |
| Wax-beta naphthol | +20 | +10 | −5 |
| Wax-beta naphtholic acid | +20 | −10 | −20 |
| Wax alpha naphthol | +20 | +15 | −5 |
| Wax-alpha naphtholic acid | +20 | −5 | −20 |

VISCOSITY INDEX

Table II below shows the comparative effectiveness of the wax-phenolic compounds and the corresponding wax-phenolic acids as improvers for the viscosity index of motor oils. The oil used in these tests was a motor lubricating oil fraction having a Saybolt viscosity of 41.8 sec. at 210 degrees F.

Table II

| Compound blended with motor oil | Concen. by weight | Saybolt viscosity | | V. I. |
|---|---|---|---|---|
| | | 100° F. | 210° F. | |
| | Percent | | | |
| None | 0 | 142.3 | 41.8 | 76.1 |
| Wax-phenol (3–20) | 2½ | 159.6 | 43.6 | 94.0 |
| Wax-phenolic acid (3–20) | 2½ | 179.4 | 45.3 | 101.2 |
| Wax-phenol (4–20) | 2½ | 160.7 | 43.7 | 94.6 |
| Wax-phenolic acid (4–20) | 2½ | 178.5 | 45.2 | 100.5 |
| Wax-beta naphthol (3–18) | 2½ | 167.5 | 44.4 | 99.4 |
| Wax-beta naphtholic acid (3–18) | 2½ | 216.2 | 50.5 | 127.5 |

In addition to the foregoing tests I have also performed comparative tests with an oil and oil blend containing a representative wax-substituted hydroxyaromatic acid to determine the comparative behavior of the improved oil composition under actual operating conditions. In this test the oil and the oil blend were used independently in a CFR engine which was operated over a period of twenty-eight hours. The engine used was of the single cylinder type cooled with a diethylene glycol-water mixture held at a temperature of about 390° F. and was operated at about 1200 R. P. M., which is equivalent to a road speed of about twenty-five miles per hour. The oil temperature remained in the neighborhood of 150° F. during the test. At the end of the test the piston was examined for stuck rings and slots filled with carbonaceous deposits. The carbonaceous deposit in the oil sample was weighed, and the neutralization number of the oil was determined. The comparative results, which are listed below in Table III, demonstrate that wax phenolic acid in an amount of two and one-half per cent is effective to retard materially the deleterious effects of oxidation which were shown to be present in the uninhibited oil.

The oil used in this test was lubricant oil having a viscosity of 120 sec. at 210° F. In the table below the oil designated as "Oil A" is the uninhibited oil and the oil designated as "Oil B" is the same oil containing two and one-half per cent of wax phenolic acid (3—16).

Table III

| | Ring condition | | | | | | | | Grams carbon deposit | N. N. |
|---|---|---|---|---|---|---|---|---|---|---|
| | Degrees struck | | | | | Percent slots filled | | | | |
| | 1 | 2 | 3 | 4 | 5 | 3 | 4 | 5 | | |
| Oil A | 0 | 0 | 360 | 360 | 90 | 35 | 80 | 10 | 15.67 | 2.1 |
| Oil B | 0 | 0 | 0 | 0 | 0 | 0 | 0 | 0 | 4.92 | 0.8 |

It will be apparent from the foregoing description that I have developed a new class of mineral oil compositions characterized by the presence of a minor proportion of alkylated hydroxyaromatic acid. It is to be understood that the properties of the added agent may be varied by the degree of alkylation, and the improvement effected in the mineral oil composition may be varied by the amount of the agent added. In general it appears that the desired improvement can be effected by amounts varying from about one-eighth per cent to about three per cent, but the invention contemplates the use in amounts varying from one-sixteenth per cent to ten per cent.

I claim:

1. An improved mineral oil composition comprising a mineral oil having admixed therewith an oil-miscible hydroxyaromatic carboxylic acid in which part of the nuclear hydrogen has been replaced with a mineral oil solubilizing substituent derived from a predominantly aliphatic hydrocarbon material.

2. An improved mineral oil composition comprising a mineral oil having admixed therewith a minor proportion of an oil-miscible hydroxyaromatic carboxylic acid in which part of the nuclear hydrogen has been substituted with predominantly aliphatic hydrocarbon material, said last-mentioned substituent comprising a sufficient proportion of the substituted hydroxyaromatic acid to render same miscible with said oil under normal conditions of handling and use.

3. An improved mineral oil composition comprising a mineral oil having admixed therewith in minor proportion: an oil-miscible wax-substituted hydroxyaromatic compound having at least one hydrogen atom on the aryl nucleus substituted with a carboxyl group.

4. An improved mineral oil composition comprising a mineral oil having admixed therewith a minor proportion of an oil-miscible alkyl-substituted hydroxyaromatic carboxylic acid in which the alkyl substituent is derived from an aliphatic hydrocarbon having at least twenty carbon atoms.

5. An improved mineral oil composition comprising a mineral oil having admixed therewith a minor proportion of an oil-miscible alkyl-substituted hydroxyaromatic carboxylic acid in which the alkyl substituent is derived from petroleum wax.

6. An improved mineral oil composition comprising a mineral oil having admixed therewith a minor proportion of an oil-miscible hydroxyaromatic carboxylic acid in which the substituent is derived from an aliphatic hydrocarbon having at least twenty carbon atoms and in which the aryl nucleus is polysubstituted with said aliphatic derivative.

7. An improved mineral oil composition comprising a mineral oil having admixed therewith a minor proportion of an oil-miscible alkyl-substituted phenol carboxylic acid in which the alkyl substituent is derived from an aliphatic hydrocarbon having at least twenty carbon atoms.

8. An improved mineral oil composition comprising a mineral oil having admixed therewith a minor proportion of an oil-miscible alkyl-substituted naphthol carboxylic acid in which the alkyl substituent is derived from an aliphatic hydrocarbon having at least twenty carbon atoms.

9. An improved mineral oil composition comprising a mineral oil having admixed therewith a minor proportion of from $\frac{1}{16}$% to 10% of an oil-miscible hydroxyaromatic carboxylic acid in which part of the nuclear hydrogen has been substituted with predominantly aliphatic hydrocarbon material, said last-mentioned substituent comprising a sufficient proportion of the substituted hydroxyaromatic acid to render same miscible with said oil under normal conditions of handling and use.

10. An improved mineral oil composition comprising a mineral oil having admixed therewith a minor proportion of from $\frac{1}{16}$% to 10% of an oil-miscible alkyl-substituted hydroxyaromatic carboxylic acid in which the alkyl substituent is derived from an aliphatic hydrocarbon having at least twenty carbon atoms.

11. An improved mineral oil composition comprising a mineral oil having admixed therewith a minor proportion of an alkylated carboxylated phenol in which the alkyl substituent is derived from petroleum wax, the proportion by weight of phenol in the alkylated phenol constituent being in the neighborhood of from about 13% to about 16%.

12. An improved mineral oil composition comprising a mineral oil having admixed therewith a minor proportion of an alkylated carboxylated hydroxyaromatic compound, the proportion by weight of the hydroxyaromatic constituent in said alkylated hydroxyaromatic constituent being chemically equivalent to not more than 20% phenol.

13. An improved mineral oil composition comprising a mineral oil having admixed therewith a minor proportion of a product obtained by: chlorinating petroleum wax until about one-fifth the weight of the reaction product is chlorine; reacting the chlorinated wax in the presence of a Friedel-Crafts catalyst with a hydroxyaromatic compound in the proportions of one mol of the latter to an amount of chlorinated wax containing at least two atomic proportions of chlorine to form a wax-substituted hydroxyaromatic compound; substituting the hydroxyl hydrogen of the last-mentioned product with a metal from the group consisting of alkali and alkaline earth metals to form a wax-substituted aryl metal oxide; carboxylating said oxide to form the salt of a wax-substituted hydroxyaromatic acid; neutralizing said salt with a mineral acid to form a wax-substituted hydroxyaromatic acid and a mineral acid salt; and finally separating said reaction salt from said substituted hydroxy-aromatic acid.

14. A composition of matter comprising a mineral oil fraction and in admixture therewith a minor proportion of an oil-miscible organic acid having the general formula $$R^v(T(OH)(COOH)Y_b)_n$$

in which: T represents an aromatic nucleus; (OH) represents at least one hydroxyl group attached to the nucleus T; (COOH) represents at least one carboxyl group attached to the nucleus T; $R^v$ represents at least one aliphatic group having a valence $v$ of one to four and attached by one valence bond only to at least one nucleus T; Y represents a monovalent radical selected from the group consisting of residual hydrogen, and chlorine, alkoxy, aroxy, aralkyl, alkaryl, aryl, nitro, and amino radicals; $b$ represents the number of Y's and is equal to zero or a whole number corresponding to the valence bonds on the nucleus T not satisfied by $R^v$, (OH), or (COOH); and $n$ is a whole number from one to four; the substituent $R^v$ comprising a sufficient proportion of the organic acid to render same miscible with said oil under normal conditions of handling and use.

15. A composition of matter comprising a mineral oil fraction and in admixture therewith a minor proportion of an oil-miscible organic acid having the general formula $$R^v(T(OH)(COOH)Y_b)_n$$

in which: T represents an aromatic nucleus; (OH) represents at least one hydroxyl group attached to the nucleus T; (COOH) represents at least one carboxyl group attached to the nucleus T; $R^v$ represents at least one aliphatic group having a valence $v$ of one to four and attached by one valence bond only to at least one nucleus T; Y represents a monovalent radical selected from the group consisting of residual hydrogen, and chlorine, alkoxy, aroxy, aralkyl, alkaryl, aryl, nitro, and amino radicals; $b$ represents the number of Y's and is equal to zero or a whole number corresponding to the valence bonds on the nucleus T not satisfied by $R^v$, (OH), or (COOH); and $n$ is a whole number from one to four, the total number of carbon atoms in all of the aliphatic groups taken together in said organic acid being not less than about twenty-five for each nucleus T.

16. A composition of matter comprising a mineral oil fraction and in admixture therewith a minor proportion of an oil-miscible organic acid having the general formula $$R^v(T(OH)(COOH)Y_b)_n$$

in which: T represents an aromatic nucleus; (OH) represents at least one hydroxyl group attached to the nucleus T; (COOH) represents at least one carboxyl group attached to the nucleus T; $R^v$ represents at least one aliphatic group having a valence $v$ of one to four and attached by one valence bond only to at least one nucleus T; Y represents a monovalent radical selected from the group consisting of residual hydrogen, and chlorine, alkoxy, aroxy, aralkyl, alkaryl, aryl, nitro, and amino radicals; $b$ represents the number of Y's and is equal to zero or a whole number corresponding to the valence bonds on the nucleus T not satisfied by $R^v$, (OH), or (COOH); and $n$ is a whole number from one to four, the ratio of $(T(OH))_n$ to $R^v(T(OH))_n$ in said organic acid being not greater than the chemical equivalent of twenty per cent phenol.

17. A composition of matter comprising a mineral oil fraction and in admixture therewith a minor proportion of an oil-miscible organic acid having the general formula $$R^{v'}(T(OH)(COOH)Y_{b'}R_c)_n$$

in which: T represents an aromatic nucleus; (OH) represents at least one hydroxyl group attached to the nucleus T; (COOH) represents at least one carboxyl group attached to the nucleus T; $R^{v'}$ represents at least one polyvalent aliphatic hydrocarbon group of at least twenty carbon atoms having a valence $v'$ of from two to four; $Y_{b'}$ represents a monovalent radical selected from the group consisting of residual hydrogen, chlorine, alkoxy, aroxy, alkaryl, aralkyl, aryl, nitro, and amino radicals; $b'$ represents the number of $Y_{b'}$'s and is equal to zero or a whole number corresponding to the number of valence bonds on the nucleus T not satisfied by $R^{v'}$, (OH), (COOH), and $R_c$; $R_c$ represents a monovalent aliphatic radical; $c$ represents the number of $R_c$'s and is equal to zero or a whole number corresponding to the number of valence bonds on the nucleus T not satisfied with $R^v$, (OH), (COOH), and $Y_{b'}$; and $n$ is a whole number from two to four.

ORLAND M. REIFF.